(12) United States Patent
Gaidon et al.

(10) Patent No.: US 12,731,215 B2
(45) Date of Patent: Sep. 8, 2026

(54) PROTECTING PERSONALLY IDENTIFIABLE INFORMATION (PII) USING MONOCULAR DEPTH ESTIMATION

(71) Applicant: Toyota Research Institute, Inc., Los Altos, CA (US)

(72) Inventors: Adrien David Gaidon, San Jose, CA (US); Vitor Campagnolo Guizilini, Santa Clara, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 274 days.

(21) Appl. No.: 18/588,816

(22) Filed: Feb. 27, 2024

(65) Prior Publication Data

US 2025/0272788 A1 Aug. 28, 2025

(51) Int. Cl.
*G06T 5/20* (2006.01)
*G06T 7/50* (2017.01)

(52) U.S. Cl.
CPC .................. *G06T 5/20* (2013.01); *G06T 7/50* (2017.01); *G06T 2207/20081* (2013.01)

(58) Field of Classification Search
CPC .... G06T 5/20; G06T 7/50; G06T 2207/20081
See application file for complete search history.

(56) References Cited

U.S. PATENT DOCUMENTS

| | | | | |
|---|---|---|---|---|
| 11,157,646 | B2 | 10/2021 | Grau | |
| 2010/0007912 | A1 | 1/2010 | Saito | |
| 2017/0104893 | A1 | 4/2017 | Hardy et al. | |
| 2019/0377901 | A1 | 12/2019 | Balzer et al. | |
| 2020/0285771 | A1 | 9/2020 | Dey et al. | |
| 2021/0004974 | A1 * | 1/2021 | Guizilini | G06T 7/55 |
| 2021/0312079 | A1 | 10/2021 | Nishida et al. | |
| 2023/0281336 | A1 | 9/2023 | Pottier et al. | |
| 2024/0394389 | A1 * | 11/2024 | Wen | G06V 20/46 |
| 2025/0131538 | A1 * | 4/2025 | Attebo | G06V 20/52 |

* cited by examiner

*Primary Examiner* — David F Dunphy
(74) *Attorney, Agent, or Firm* — Christopher G. Darrow; Darrow Mustafa PC

(57) ABSTRACT

Systems, methods, and other embodiments described herein relate to protecting personally identifiable information (PII) with the use of a monocular depth estimation. In one embodiment, a method includes acquiring an original image depicting surrounding objects present in an environment. The method includes generating a depth map from the original image using a depth model that performs monocular depth estimation. The method includes obscuring at least a portion of the original image according to the depth map to provide an obscured image. The method includes providing the obscured image.

17 Claims, 5 Drawing Sheets

PROTECTING PERSONALLY IDENTIFIABLE INFORMATION (PII) USING MONOCULAR DEPTH ESTIMATION

TECHNICAL FIELD

The subject matter described herein relates, in general, to systems and methods for protecting personally identifiable information (PII) and, more particularly, to using monocular depth estimation within an image processing pipeline to obscure PII.

BACKGROUND

As technology advances, traditional concepts of security morph into more complex systems that involve additional features but also encounter additional/different risks. For example, many vehicles now include the ability to collect data about the surrounding environment, such as by using cameras to acquire images that may then be used for various functions (e.g., advanced driving assistance systems (ADAS)) of the vehicle. The ability to collect this data and use the data for the noted purposes or provide the data to another entity enables additional features for the vehicle. For example, using the data with ADAS enables improved safety within the vehicle, while communicating the data may provide for tracking vehicle maintenance, automating reminders, improving security, and so on. In the context of a manufacturer, the image data provides insights about vehicle usage, training data for improving vehicle systems, and so on.

However, the imaging data also includes personally identifiable information (PII), which is data that explicitly identifies a particular person, such as a face or license plate. Thus, with the advent of personal data privacy laws such as the California Online Privacy Protection Act (CalOPPA), the European Union General Data Protection Regulation (GDPR), and others, imaging data that is unsecured can be problematic. That is, the collection or communication of the imaging data represents a significant difficulty since the imaging data generally includes PII data that may be subject to various statutes that require secure storage. However, mechanisms for properly securing the data are generally unavailable or ill-suited for integration with existing imaging pipelines. As one example, solutions may simply filter out any image that includes PII, thereby limiting available data.

SUMMARY

Example systems and methods relate to protecting PII by using monocular depth estimation to facilitate obscuring data. As noted previously, adequately protecting PII within an imaging pipeline represents a complex task with a limited set of potential solutions. That is, protecting PII, such as faces, within image data generally involves identifying the presence of the PII and then simply removing the associated image from a data set. This results in fewer examples and holes within the data overall, thereby degrading the quality of the data for various purposes, such as training a machine learning algorithm. Accordingly, in at least one arrangement, a masking system is disclosed that implements a novel approach to protecting PII by, for example, selectively masking regions of an image with substitute information from a depth map of the same image.

For example, in one approach, the masking system is implemented as part of an image processing pipeline within a device, such as a vehicle. The masking system then initially acquires images from a camera prior to the images being communicated or stored. The masking system can then process the original image using a machine learning algorithm that functions to derive a separate representation of a scene depicted by the image. That is, in the present example, the masking system performs monocular depth estimation over the image by applying a depth model. The depth model accepts the original image and outputs a depth map that is a pixel-wise determination of depths in the scene depicted by the image. In general, the depth map is simply representing depth values and not RGB images. Thus, the representation of the scene derived by the depth model does not convey details of faces, license plates, or other PII. Instead, the depth map functions to obscure the PII while still providing a depiction of the scene from the original image.

As such, in one or more arrangements, the masking system secures the PII of the original image by providing the depth map as a substitute. Consequently, in at least one approach, the masking system discards the original image to secure the PII that is present therein while providing the depth map as a replacement. Of course, in further arrangements, the masking system may selectively obscure one or more portions of the image to protect the PII instead of wholly replacing the image with the depth map. Consider that the PII that is present within any given image is often a relatively small section of the image. Thus, discarding the entirety of the RGB information from the image and using the depth map may dispose of useful information that is not protected.

Accordingly, the masking system, in at least one arrangement, identifies PII within the image and masks portions corresponding to the PII. In one aspect, the masking system uses an additional model, such as a semantic model that performs semantic segmentation. Accordingly, the masking system processes the image using the semantic model, which identifies a semantic classification for separate pixels in the image. The semantic model may provide a fine level of detail such that identification of not just overall objects (e.g., people, vehicles, etc.) is provided but also salient portions of the objects, such as faces, license plates, and so on. Using this information along with the depth map, the system can mask the portions of the image associated with the PII alone without discarding the whole image. That is, in one example, the masking system uses information from the depth map that corresponds with portions of the image, including protected information, and masks the protected information in the image with the information from the depth without covering or otherwise discarding other areas of the image. As a result, the masking system generates a combined image that includes depth data within select areas corresponding with the PII. In this way, the masking system protects the PII while also retaining non-protected information and still providing an adequate representation of the protected portions without exploiting the PII itself, thereby improving the process of protecting the information while overcoming the noted difficulties.

In one embodiment, a masking system is disclosed. The masking system includes one or more processors and a memory communicably coupled to the one or more processors. The memory stores instructions that, when executed by the one or more processors, cause the one or more processors to acquire an original image depicting surrounding objects present in an environment. The instructions include instructions to generate a depth map from the original image using a depth model that performs monocular depth estimation. The instructions include instructions to obscure at least a portion of the original image according to the depth map to provide an obscured image. The instructions include instructions to provide the obscured image.

In one embodiment, a non-transitory computer-readable medium including instructions that, when executed by one or more processors, cause the one or more processors to perform various functions is disclosed. The instructions include instructions to acquire an original image depicting surrounding objects present in an environment. The instructions include instructions to generate a depth map from the original image using a depth model that performs monocular depth estimation. The instructions include instructions to obscure at least a portion of the original image according to the depth map to provide an obscured image. The instructions include instructions to provide the obscured image.

In one embodiment, a method is disclosed. In one embodiment, the method includes acquiring an original image depicting surrounding objects present in an environment. The method includes generating a depth map from the original image using a depth model that performs monocular depth estimation. The method includes obscuring at least a portion of the original image according to the depth map to provide an obscured image. The method includes providing the obscured image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
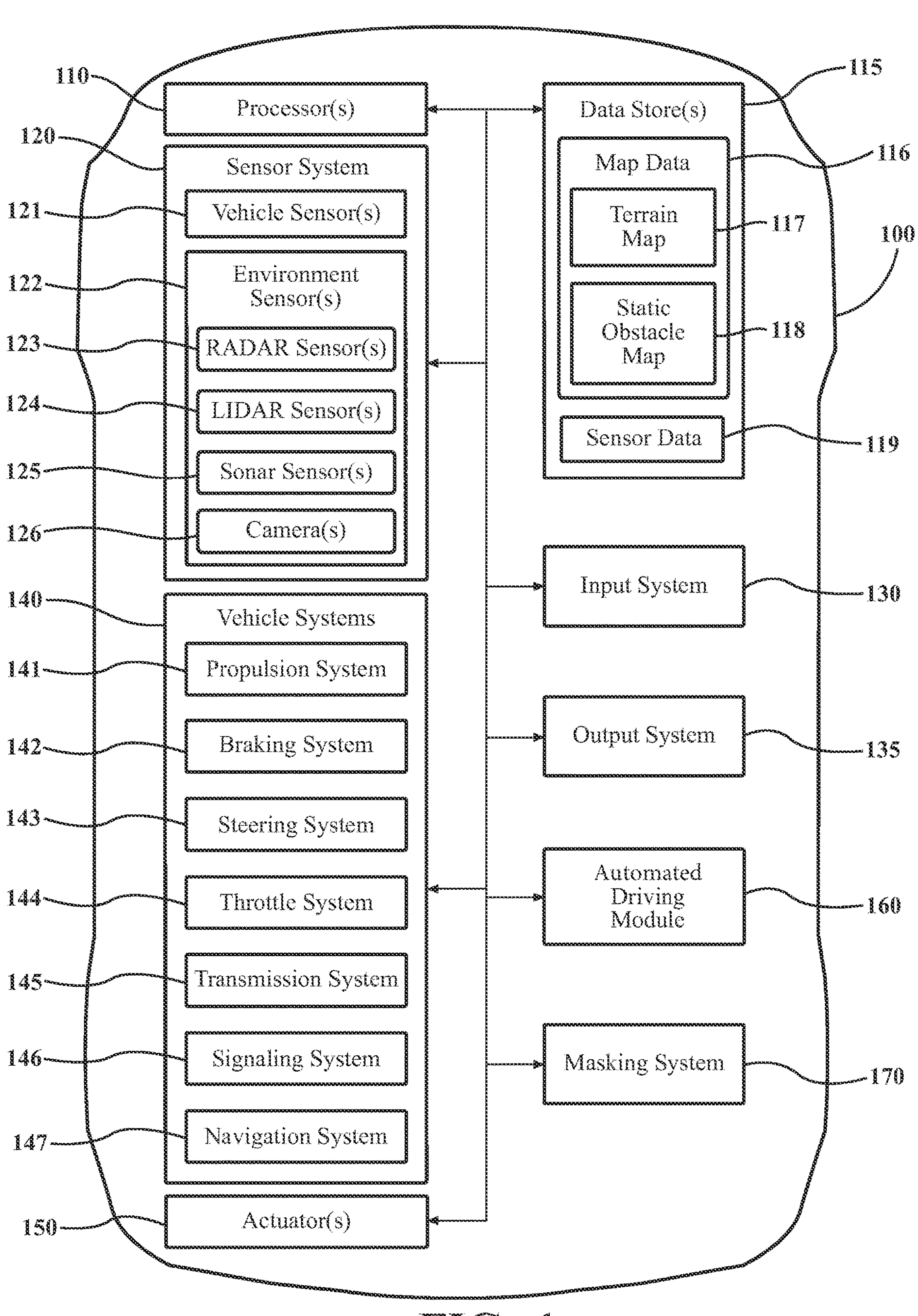
FIG. 1 illustrates one embodiment of a vehicle within which systems and methods disclosed herein may be implemented.

Systems, methods, and other embodiments associated with protecting PII by using monocular depth estimation to facilitate obscuring data. As noted previously, adequately protecting PII within an imaging pipeline represents a complex task with a limited set of potential solutions. That is, protecting PII, such as faces, within image data generally involves identifying the presence of the PII and then simply removing the associated image from a data set. This results in fewer examples and holes within the data overall, thereby degrading the quality of the data for various purposes, such as training a machine learning algorithm. Accordingly, in at least one arrangement, a masking system is disclosed that implements a novel approach to protecting PII by, for example, selectively masking regions of an image with substitute information from a depth map of the same image.

For example, in one approach, the masking system is implemented as part of an image processing pipeline within a device, such as a vehicle. The masking system then initially acquires images from a camera prior to the images being communicated or stored. The masking system can then process the original image using a machine learning algorithm that functions to derive a separate representation of a scene depicted by the image. That is, in the present example, the masking system performs monocular depth estimation over the image by applying a depth model. The depth model accepts the original image and outputs a depth map that is a pixel-wise determination of depths in the scene depicted by the image. In general, the depth map is simply representing depth values and not RGB images. Thus, the representation of the scene derived by the depth model does not convey details of faces, license plates, or other PII. Instead, the depth map functions to obscure the PII while still providing a depiction of the scene from the original image.

As such, in one or more arrangements, the masking system secures the PII of the original image by providing the depth map as a substitute. Consequently, in at least one approach, the masking system discards the original image to secure the PII that is present therein while providing the depth map as a replacement. Of course, in further arrangements, the masking system may selectively obscure one or more portions of the image to protect the PII instead of wholly replacing the image with the depth map. Consider that the PII that is present within any given image is often a relatively small section of the image. Thus, discarding the entirety of the RGB information from the image and using the depth map may dispose of useful information that is not protected.

Accordingly, the masking system, in at least one arrangement, identifies PII within the image and masks portions corresponding to the PII. In one aspect, the masking system uses an additional model, such as a semantic model that performs semantic segmentation. Accordingly, the masking system processes the image using the semantic model, which identifies a semantic classification for separate pixels in the image. The semantic model may provide a fine level of detail such that identification of not just overall objects (e.g., people, vehicles, etc.) is provided but also salient portions of the objects, such as faces, license plates, and so on. Using this information along with the depth map, the system can mask the portions of the image associated with the PII alone without discarding the whole image. That is, in one example, the masking system uses information from the depth map that corresponds with portions of the image, including protected information, and masks the protected information in the image with the information from the depth without covering or otherwise discarding other areas of the image. As a result, the masking system generates a combined image that includes depth data within select areas corresponding with the PII. In this way, the masking system protects the PII while also retaining non-protected information and still providing an adequate representation of the protected portions without exploiting the PII itself, thereby improving the process of protecting the information while overcoming the noted difficulties.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic device (e.g., smartphone, surveillance camera, robot, etc.) that, for example, perceives an environment according to images, and thus benefits from the functionality discussed herein. In yet further embodiments, the vehicle 100 may instead be a statically mounted device, an embedded device, or another device that uses images to perceive an environment.

In any case, the vehicle 100 (or another electronic device) also includes various elements. It will be understood that, in various embodiments, it may not be necessary for the vehicle 100 to have all of the elements shown in FIG. 1. The vehicle 100 can have a different combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a masking system 170 that functions to train and implement a model to process monocular images and provide depth estimates for an environment (e.g., objects, surfaces, etc.) depicted therein. Moreover, while depicted as a standalone component, in one or more embodiments, the masking system 170 is integrated with the automated driving module 160, the camera 126, or another component of the vehicle 100. The noted functions and methods will become more apparent with a further discussion of the figures.

Figure 2:
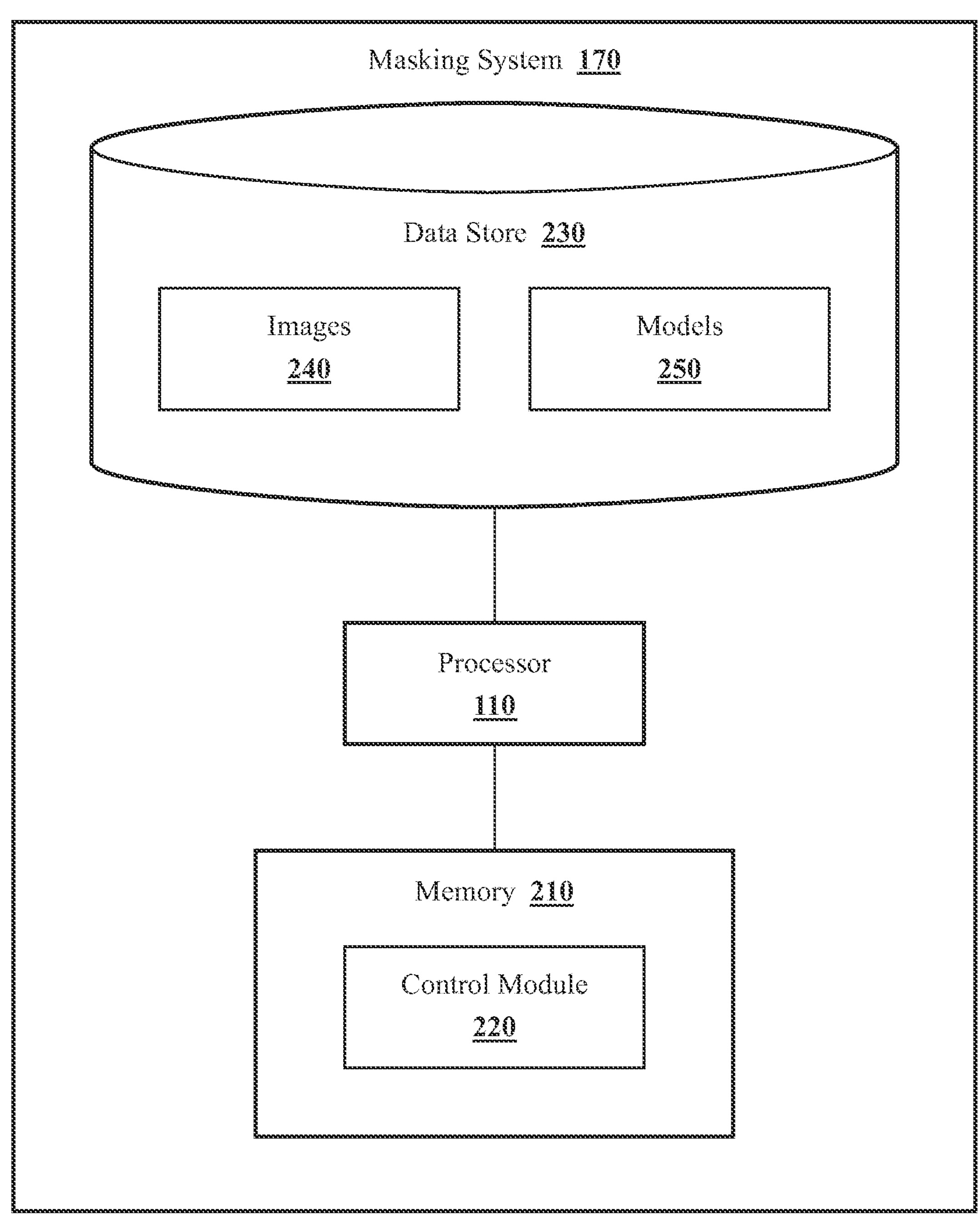
FIG. 2 illustrates one embodiment of a masking system that is associated with protecting PII using a depth model.

With reference to FIG. 2, one embodiment of the masking system 170 is further illustrated. The masking system 170 is shown as including a processor 110. Accordingly, the processor 110 may be a part of the masking system 170 or the masking system 170 may access the processor 110 through a data bus or another communication path. In one or more embodiments, the processor 110 is an application-specific integrated circuit (ASIC) that is configured to implement functions associated with a control module 220. In general, the processor 110 is an electronic processor, such as a microprocessor, that is capable of performing various functions, as described herein. In one embodiment, the masking system 170 includes a memory 210 that stores the control module 220. The memory 210 is a random-access memory (RAM), read-only memory (ROM), a hard disk drive, a flash memory, or other suitable memory for storing the control module 220. The control module 220 is, for example, computer-readable instructions that, when executed by the processor 110, cause the processor 110 to perform the various functions disclosed herein.

Furthermore, in one embodiment, the masking system 170 includes a data store 230. The data store 230 is, in one embodiment, an electronic data structure, such as a database, that is stored in the memory 210 or another memory, and that is configured with routines that can be executed by the processor 110 for analyzing stored data, providing stored data, organizing stored data, and so on. Thus, in one embodiment, the data store 230 stores data used by the control module 220 in executing various functions. In one embodiment, the data store 230 includes images 240, and models 250, which may include a depth model, and/or a semantic model, along with, for example, other information that is used by the control module 220.

It should be appreciated that the models 250 are, for example, machine learning models. As such, the masking system 170 or another system function to train the models 250 using training data. The training data generally includes one or more monocular videos to train the depth model. The videos are comprised of a plurality of frames in the form of the images 240 that are monocular images. Of course, the images 240 may alternatively be input images for use during inference by the depth model. That is, in relation to the models 250, it should be noted that the models 250 are first trained on a particular task (e.g., monocular depth estimation) as a pre-configuration step and then used during inference to perform the task. Accordingly, the form of the input data may vary according to the type of training as compared to inference.

In any case, as described herein, a monocular image is, for example, an image from the camera 126, or another monocular camera, that may be part of a video, and that encompasses a field-of-view (FOV) about the vehicle 100 of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side-facing FOV, or some other subregion as defined by the characteristics of the camera 126.

The monocular image itself includes visual data of the FOV that is encoded according to a video/image standard (e.g., codec) associated with the camera 126. In general, the characteristics of the camera 126 and a video/image standard define a format of the monocular image. Thus, while the particular characteristics can vary according to different implementations, in general, the image has a defined resolution (i.e., height and width in pixels) and format. Thus, for example, the monocular image is generally an RGB visible light image. Whichever format that the masking system 170 implements, the images 240 are monocular images in that there is no explicit additional modality indicating depth nor an explicit corresponding image from another camera from which the depth can be derived (i.e., no stereo camera pair). In contrast to a stereo image that may integrate left and right images from separate cameras mounted to generate an overlapping FOV to provide an additional depth channel, the monocular image does not include explicit depth information, such as disparity maps derived from comparing the stereo images pixel-by-pixel. Instead, the monocular image implicitly provides depth information in the relationships of perspective and a size of elements depicted therein from which the depth model derives the depth maps.

Moreover, the monocular video may include observations of many different scenes. That is, as the camera 126 or another original source camera of the video progresses through an environment, perspectives of objects and features in the environment change, and the depicted objects/features themselves also change, thereby depicting separate scenes (i.e., particular combinations of objects/features). Thus, the masking system 170 may extract particular training sets (e.g., pairs of source and target images) of monocular images from the monocular video for training. In particular, the masking system 170 generates the sets of images from the video so that the sets of images are of the same scene are related through the depiction of the same scene. As should be appreciated, the video includes a series of monocular images that are taken in succession according to a configuration of the camera. Thus, the camera may generate the images 240 (also referred to herein as frames) of the video at regular intervals, such as every 0.033 s. That is, a shutter of the camera operates at a particular rate (i.e., frames-per-second (fps)), which may be, for example, 24 fps, 30 fps, 60 fps, etc.

For purposes of the present discussion, the fps is presumed to be 30 fps. However, it should be appreciated that the fps may vary according to a particular configuration. Moreover, the masking system 170 need not generate the images for training from successive ones (i.e., adjacent) of the video frames, but instead can generally include separate images of the same scene that are not successive as training images. Thus, in one approach, the masking system 170 selects every other image depending on the fps. In a further approach, the masking system selects every fifth image as a training pair. The greater the timing difference in the video between the images, the more pronounced a difference in camera position; however, this may also result in fewer shared features/objects between the images. As such, the pairs of training images are of a same scene and are generally constrained, in one or more embodiments, to be within a defined number of frames (e.g., 5 or fewer) to ensure correspondence of an observed scene between the monocular training images. In any case, the pairs of training images generally have the attributes of being monocular images from a monocular video that are separated by some interval of time (e.g., 0.06 s) such that a perspective of the camera changes between the pair of training images as a result of the motion of the camera through the environment while generating the video.

Moreover, while the images 240 are described as training images (i.e., for purposes of adapting the depth model to improve accuracy/understanding), the masking system 170 similarly processes images of the same/similar character after training and during inference to generate the noted outputs (i.e., the depth maps). Thus, during inference and while in use as implemented, the images 240 are instead derived from a monocular camera and may not be associated via a video. Additionally, while the depth model generates a single depth map per image, the pose model accepts inputs of multiple images (e.g., two or more) to produce outputs (i.e., a transformation between image views).

With further reference to FIG. 2, the masking system 170 further includes the models 250, which includes the depth model that produces the depth maps, and, in at least one approach, a semantic model. The semantic model and the depth model are, in one embodiment, machine learning algorithms. However, the particular form of the models 250 may be generally distinct. That is, for example, the depth model is a machine learning algorithm that accepts an electronic input in the form of a single monocular image and produces a depth map as a result of processing the monocular image. The exact form of the depth model may vary according to the implementation but is generally a convolutional encoder-decoder type of neural network.

Figure 3:
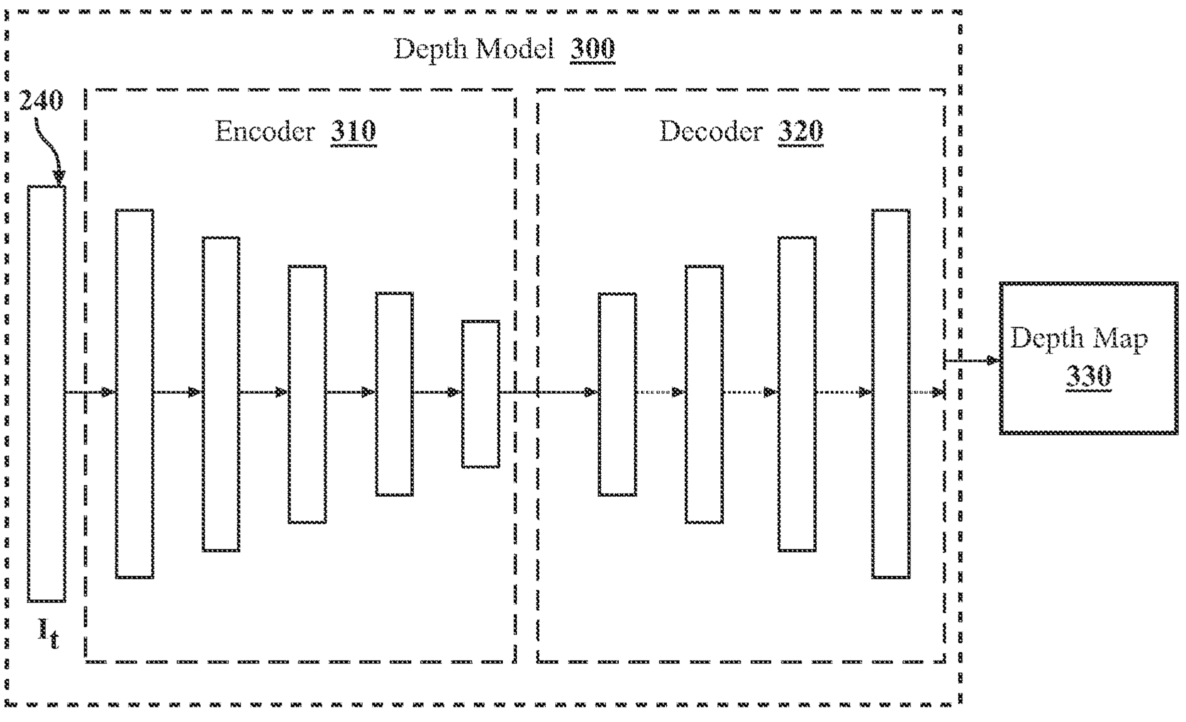
FIG. 3 illustrates one embodiment of a depth model that infers depth from a monocular image.

As an additional explanation of one embodiment of the depth model, consider FIG. 3. FIG. 3 illustrates a detailed view of a depth model 300. In one embodiment, the depth model 300 has an encoder/decoder architecture. The encoder/decoder architecture generally includes a set of neural network layers, including convolutional components embodied as an encoder 310 (e.g., 2D and/or 3D convolutional layers forming an encoder) that flow into deconvolutional components embodied as a decoder 320 (e.g., 2D and/or 3D deconvolutional layers forming a decoder). In one approach, the encoder 310 accepts one of the images 240 at a time as an electronic input and processes the image to extract features therefrom. The features are, in general, aspects of the image that are indicative of spatial information that the image intrinsically encodes. As such, encoding layers that form the encoder function to, for example, fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image.

Accordingly, in one embodiment, the encoder 310 is comprised of multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers in the depth model 300. As such, the encoder 310 includes a variety of separate layers that operate on the monocular image, and subsequently on derived/intermediate feature maps that convert the visual information of the monocular image into embedded state information in the form of encoded features of different channels.

In one embodiment, the decoder 320 unfolds (i.e., adapts dimensions of the tensor to extract the features) the previously encoded spatial information in order to derive the depth map 330 for a given image according to learned correlations associated with the encoded features. That is, the decoding layers generally function to up-sample, through sub-pixel convolutions and/or other mechanisms, the previously encoded features into the depth map 330, which may be provided at different resolutions. In one embodiment, the decoding layers comprise unpacking blocks, two-dimensional convolutional layers, and inverse depth layers that function as output layers for different scales of the feature map. The depth map 330 is, in one embodiment, a data structure corresponding to the input image that indicates distances/depths to objects/features represented therein. Additionally, in one embodiment, the depth map 330 is a tensor with separate data values indicating depths for corresponding locations in the image on a per-pixel basis.

Moreover, the depth model 300 can further include skip connections for providing residual information between the encoder 310 and the decoder 320 to facilitate memory of higher-level features between the separate components. While a particular encoder/decoder architecture is discussed, as previously noted, the depth model 300, in various approaches, may take different forms and generally functions to process the monocular images and provide depth maps that are per-pixel estimates about distances of objects/features depicted in the images.

Moreover, while the semantic model is not explicitly illustrated, it should be noted that the semantic model may be comprised of a similar encoder/decoder architecture that separately processes the images 240 to provide semantic mappings of the images 240. Accordingly, the semantic model may be a convolutional neural network (CNN). In one arrangement, the semantic model and the depth model 300 may share the encoder 310 while having distinct decoder heads for the separate tasks. Additionally, the semantic model also uses images for training, but the images may be combined with semantic labels as a source of supervision to facilitate the training. In this way, the semantic model is able to learn an ontology for objects and portions of objects depicted in the images. The particular degree of identification (i.e., object, object component, etc.) may be further supplemented by, in one or more arrangements, one or more intermediate models that further segment and identify components of the overall object. In any case, the semantic model processes the images to output a semantic mapping that details classifications for objects and portions of objects depicted in the image.

As an additional note, while the models 250 are discussed as discrete units separate from the control module 220, the models 250 are, in one or more arrangements, generally integrated, at least in part, with the control module 220. That is, the control module 220 functions to execute various processes of the models 250 and use various data structures of the models 250 in support of such execution. Accordingly, in one embodiment, the control module 220 includes instructions that function to control the processor 110 to generate the outputs using the models 250.

In any case, the control module 220, in one approach, trains the depth model according to a self-supervised approach that involves generating a loss, which may include an appearance-based loss (e.g., photometric loss), a depth smoothness, and so on. However, in various arrangements, one or more of the terms may not be included or further terms may be added. Moreover, in yet further approaches, the loss calculation may not be appearance-based but may instead rely on direct comparisons of depth maps. In any case, through this training, the depth model 300 develops a learned prior of the monocular images as embodied by the internal parameters of the model 300 from the training on the images. In general, the depth model develops the learned understanding about how depth relates to various aspects of an image according to, for example, size, perspective, and so on.

It should be appreciated that the control module 220, in one or more configurations, trains the depth model 300 and a pose model together in an iterative manner over the training data embodied by sets of images that includes a plurality of monocular images from video. Through the process of training the model 300, the control module 220 adjusts various hyper-parameters in the depth model 300 to fine-tune the functional blocks included therein. Through this training process, the depth model 300 develops a learned prior of the monocular images as embodied by the internal parameters. In general, the depth model 300 develops the learned understanding about how depth relates to various aspects of an image according to, for example, size, perspective, and so on. Consequently, the control module 220 can provide the resulting trained depth model 300 in the masking system 170 to estimate depths from monocular images that do not include an explicit modality identifying the depths.

Figure 4:
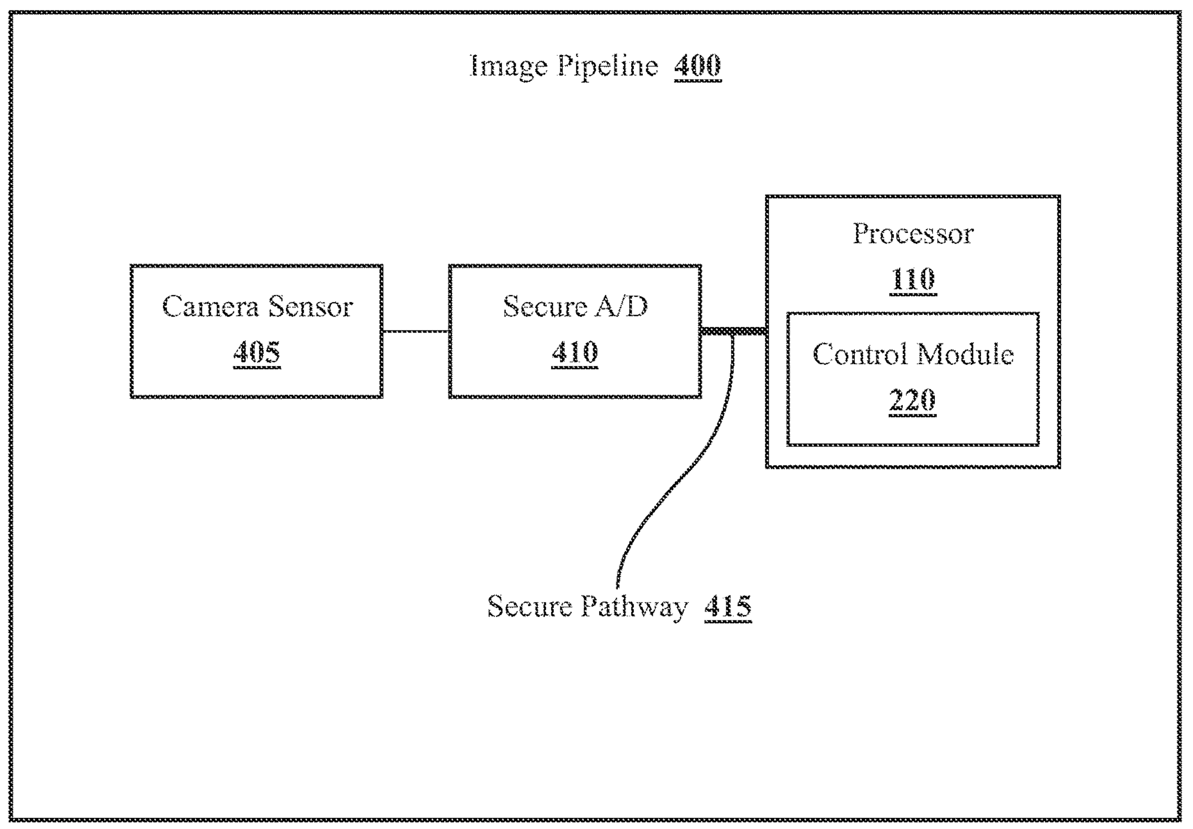
FIG. 4 illustrates one embodiment of an image pipeline.

As a brief example of an image pipeline 400 implemented with the models 250, consider FIG. 4. FIG. 4 is illustrated from the perspective of hardware elements involved in acquiring the images 240 and processing the images 240 into a protected output. As shown, a camera sensor 405 initially acquires an image and passes the acquired signal to a secure analog-to-digital converter 410. In one or more arrangements, the secure A/D converter 410 is integrated with the camera 405. In any case, the secure A/D converter 410 may provide the image via a secure pathway to the processor 110 for analysis via the control module 220 according to the models 250. It should be noted that the image pipeline 400 generally represents a trusted hardware architecture that may be implemented along with the described systems and methods. In general, the trusted architecture implemented via the noted components, such as the secure pathway 415 and others implement trusted mechanisms that prevent sniffing or any other copying of the data acquired and communicated therein. Thus, the PII that may be present within the images 240 as acquired via the camera sensor 405 and communicated via the image pipeline 400 into the processor 110 are secure from external interference that may result in exposing the PII. In this way, the image pipeline facilitates further securing the PII.

Figure 5:
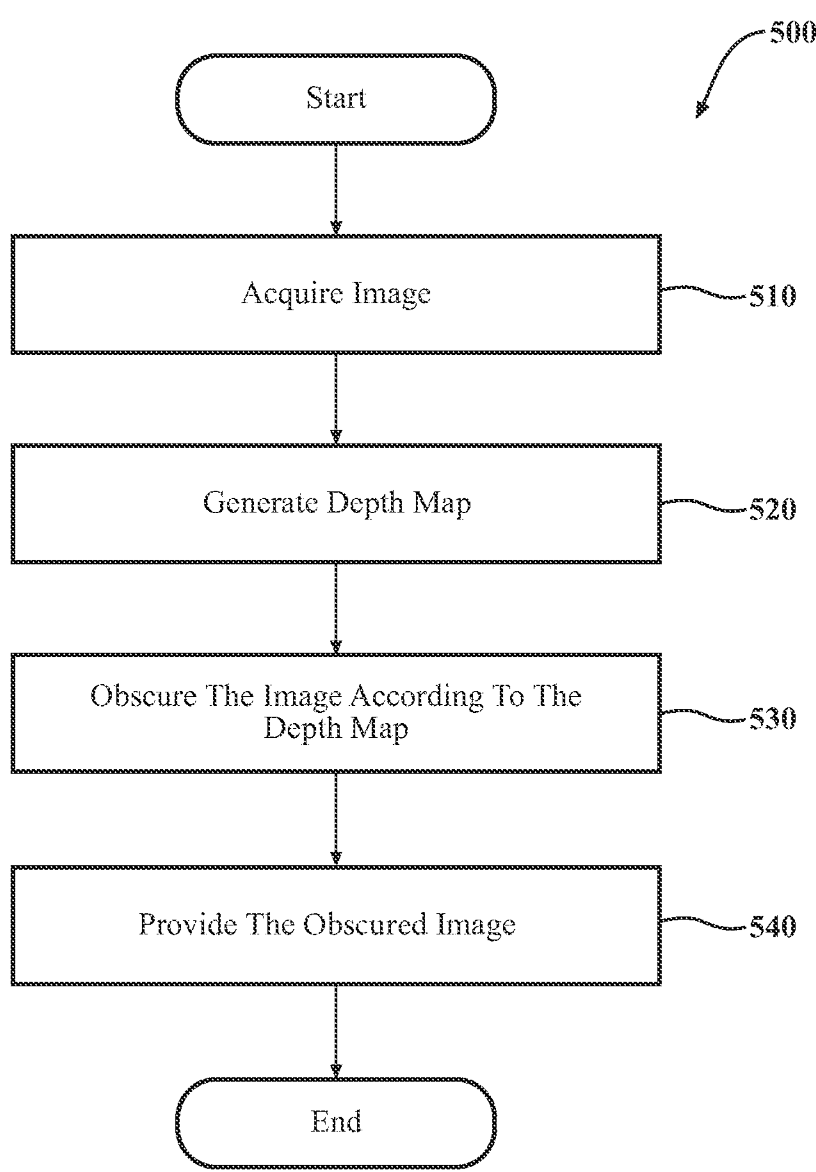
FIG. 5 is a flowchart illustrating one embodiment of a method for obscuring PII within images.

FIG. 5 illustrates a flowchart of a method 500 that is associated with using a depth model to secure PII. Method 500 will be discussed from the perspective of the masking system 170. While method 500 is discussed in combination with the masking system 170, it should be appreciated that the method 500 is not limited to being implemented within the masking system 170 but is instead one example of a system that may implement the method 500.

At 510, the control module 220 acquires the images 240. In the instance of inference, the control module 220 actively acquires the images 240 from the camera 126/405. That is, as one example, while the vehicle 100 is operating in an environment, the control module 220 is capturing the images 240, which the masking system 170 can then process according to the method 500. The images 240 are generally described as being "original images" herein. This use is in reference to an unaltered form of the image that may include PII. The images 240 depict surrounding objects present in an environment in which the camera has a particular field-of-view (FoV). Thus, the images 240 may or may not include PII.

At 520, the control module 220 generates a depth map for the image. In one approach, the control module 220 applies the depth model to the image to derive the depth map. The depth map provides a pixel-wise estimation of depth values within a scene depicted by the image. This includes distances from the camera sensor to various objects depicted in the image, such as vehicles, buildings, road surfaces, trees, people, and so on. In general, the depth map provides depth information at a granularity of the pixel. Accordingly, the depth map includes corresponding depth values for separate pixels in the image. As such, the level of detail in the depth map relates to the resolution of the original image but is further altered in that differences in color are not generally depicted in the depth map because they do not relate to distance. As such, elements having a same depth, such as a face of a person are shown with generally similar depth values that obscure the detail of the face. Similarly, license plates generally have an overall singular depth without portraying PII that may otherwise be present. Even in the case of embossed or letters/numbering with relief, the sensitivity of the depth information is not of a degree as to expose the PII. Thus, the depth map alone generally conceals PII.

At 530, the control module 220 obscures the original image according to the depth map to provide an obscured image. In one arrangement, the control module 220 provides no consideration of the content of the original image but simply replaces the original image with the depth map and provides the depth map as the obscured image. This further includes disposing (i.e., deleting) of the original image to secure the PII.

In further approaches, the control module 220 further analyzes the original image 240 to identify particular aspects of the image and consider how to obscure any PII that may be present. For example, in one approach, the control module 220 applies a semantic model to the original image 240 that identifies semantic classes of the surrounding objects depicted in the original image. As previously noted, the semantic classes include, for example, people, vehicles, animals, road signs, buildings, surfaces (e.g., ground, road, etc.), and so on. Moreover, beyond the general identification of classes for the objects, the semantic model, in at least one approach, identifies specific features of the objects, such as faces, license plates, house numbers, etc. As such, the control module 220 can use the semantic information in different weights to further filter and obscure any PII that may be present.

It should be appreciated that, as used herein, PII generally includes personal information, such as faces, license plates, house numbers, and so on. Of course, the masking system 170 can be adapted to include additional information, and/or different information that explicitly specified herein.

In further approaches, the control module 220 uses the semantic information provided by the semantic model to filter between images that include PII and those that do not. That is, because images without PII do not need to be protected, the control module 220 may analyze the semantic information for each image to identify whether any of the protected classes (e.g., people, vehicles, etc.) are present or not. When the protected classes are present, then the control module 220 substitutes the depth map for the original image. However, otherwise, the original image is retained and not obscured.

In yet further embodiments, in place of wholly replacing the original image with the depth map, the control module masks a portion of the original image that includes the PII. In this approach, the control module 220 further discriminates between images with protected classes and without but also identifies whether the images depict specific aspects of the semantic classes, including faces, license plates, or other particular PII. Thus, only when the PII is explicitly present will the control module 220 obscure the PII. Further, the control module 220 does not wholly replace the original image with the depth map. Instead, the control module 220 obscures the portion that is the PII. That is, the control module 220 masks the specific face(s), license plate(s), house numbers, and other PII while retaining other parts of the original image.

Because the semantic model generates a mapping on a per-pixel basis of the original image with annotations about semantic classes for the separate pixels, the control module 220 parses the annotations to identify portions that include PII and then masks only the portions. The control module 220 masks the portion of the image by, for example, replacing the portion with a corresponding portion from the depth map to remove personally identifiable information (PII). That is, the control module 220 segments a corresponding section of the depth map and replaces the same portion within the image using the segmented portion of the depth map to generate the obscured image. In this way, the control module 220 is able to retain as much of the original image as possible while still securing the PII and while still providing useful information in place of the PII.

At 540, the control module 220 provides the obscured image. In one arrangement, the control module 220 provides the obscured image in place of the original image to secure personally identifiable information (PII). This may include, for example, deleting the original image and communicating the obscured image to other systems, such as an autonomous driving module 160 or another system remote from the masking system 170. For example, the masking system 170 originally acquires and processes the original image into the obscured image to remove the PII, and then provides the obscured image to a remote cloud-based entity for processing to identify, for example, potholes or other conditions of a roadway. Because the PII has already been removed, there is then no concern for exposing personal information and violating any privacy laws. In a further example, the obscured image may be used within the autonomous driving module 160 to control the vehicle 100 or plan a maneuver of the vehicle 100. However, if, for example, the vehicle encounters a manual takeover by the driver because the control was inappropriate, then the system may save the obscured image as training data to improve the module 160 for future implementation. In yet further examples, the control module 220 may simply store all of the obscured images after processing in order to generate training data for various models. In this way, the masking system 170 is able to collect potentially sensitive information and secure the information against exposure while still maintaining useful data.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the masking system 170, and/or the automated driving module 160 can be operatively connected to communicate with the various vehicle systems 140 and/or individual components thereof. For example, returning to FIG. 1, the processor(s) 110 and/or the automated driving module 160 can be in communication to send and/or receive information from the various vehicle systems 140 to control the movement, speed, maneuvering, heading, direction, etc. of the vehicle 100. The processor(s) 110, the masking system 170, and/or the automated driving module 160 may control some or all of these vehicle systems 140 and, thus, may be partially or fully autonomous.

The processor(s) 110, the masking system 170, and/or the automated driving module 160 can be operatively connected to communicate with the various vehicle systems 140 and/or individual components thereof. For example, returning to FIG. 1, the processor(s) 110, the masking system 170, and/or the automated driving module 160 can be in communication to send and/or receive information from the various vehicle systems 140 to control the movement, speed, maneuvering, heading, direction, etc. of the vehicle 100. The processor(s) 110, the masking system 170, and/or the automated driving module 160 may control some or all of these vehicle systems 140.

The processor(s) 110, the masking system 170, and/or the automated driving module 160 may be operable to control the navigation and/or maneuvering of the vehicle 100 by controlling one or more of the vehicle systems 140 and/or components thereof. For instance, when operating in an autonomous mode, the processor(s) 110, the masking system 170, and/or the automated driving module 160 can control the direction and/or speed of the vehicle 100. The processor(s) 110, the masking system 170, and/or the automated driving module 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the automated driving module 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module 160 can be configured to receive data from the sensor system 120 and/or any other type of system capable of capturing information relating to the vehicle 100 and/or the external environment of the vehicle 100. In one or more arrangements, the automated driving module 160 can use such data to generate one or more driving scene models. The automated driving module 160 can determine a position and velocity of the vehicle 100. The automated driving module 160 can determine the location of obstacles, obstacles, or other environmental features including traffic signs, trees, shrubs, neighboring vehicles, pedestrians, etc.

The automated driving module 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module 160 either independently or in combination with the masking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module 160 can be configured to implement determined driving maneuvers. The automated driving module 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A masking system, comprising:

one or more processors;

a memory communicably coupled to the one or more processors and storing instructions that, when executed by the one or more processors, cause the one or more processors to:

acquire an original image depicting surrounding objects present in an environment;

generate a depth map from the original image using a depth model that performs monocular depth estimation;

obscure at least a portion of the original image according to the depth map to provide an obscured image including instructions to mask at least a portion of the surrounding objects by replacing the portion of the surrounding objects with corresponding portions from the depth map to remove personally identifiable information (PII); and provide the obscured image.

2. The masking system of claim 1, wherein the depth model performs monocular depth estimation and is trained according to self-supervised structure-from-motion (SfM) training.

3. The masking system of claim 1, wherein the instructions include instructions to obscure the original image include instructions to replace the original image with the depth map and disposing of the original image to secure personally identifiable information (PII) in the original image.

4. The masking system of claim 1, wherein the instructions include instructions to obscure the original image include instructions to apply a semantic model to the original image that identifies semantic classes of the surrounding objects depicted in the original image, including at least people.

5. The masking system of claim 1, wherein the instructions to mask include instructions to place the portions of the depth map to obscure one or more of: faces and license plates.

6. The masking system of claim 1, wherein the instructions include instructions to provide the obscured image include instructions to provide the obscured image in place of the original image to secure personally identifiable information (PII).

7. The masking system of claim 1, wherein the masking system is integrated into an image processing pipeline within a vehicle to secure personally identifiable information (PII) in the original image during operation of the vehicle.

8. A non-transitory computer-readable medium including instructions that, when executed by one or more processors, cause the one or more processors to:

acquire an original image depicting surrounding objects present in an environment;

generate a depth map from the original image using a depth model that performs monocular depth estimation;

obscure at least a portion of the original image according to the depth map to provide an obscured image including instructions to mask at least a portion of the surrounding objects by replacing the portion of the surrounding objects with corresponding portions from the depth map to remove personally identifiable information (PII); and provide the obscured image.

9. The non-transitory computer-readable medium of claim 8, wherein the depth model performs monocular depth estimation and is trained according to self-supervised structure-from-motion (SfM) training.

10. The non-transitory computer-readable medium of claim 8, wherein the instructions include instructions to obscure the original image include instructions to replace the original image with the depth map and disposing of the original image to secure personally identifiable information (PII) in the original image.

11. The non-transitory computer-readable medium of claim 8, wherein the instructions include instructions to obscure the original image include instructions to apply a semantic model to the original image that identifies semantic classes of the surrounding objects depicted in the original image, including at least people.

12. A method, comprising:

acquiring an original image depicting surrounding objects present in an environment;

generating a depth map from the original image using a depth model that performs monocular depth estimation;

obscuring at least a portion of the original image according to the depth map to provide an obscured image including masking at least a portion of the surrounding objects by replacing the portion of the surrounding objects with corresponding portions from the depth map to remove personally identifiable information (PII); and providing the obscured image.

13. The method of claim 12, wherein the depth model performs monocular depth estimation and is trained according to self-supervised structure-from-motion (SfM) training.

14. The method of claim 12, wherein obscuring the original image includes replacing the original image with the depth map and disposing of the original image to secure personally identifiable information (PII) in the original image.

15. The method of claim 12, wherein obscuring the original image includes applying a semantic model to the original image that identifies semantic classes of the surrounding objects depicted in the original image, including at least people.

16. The method of claim 12, wherein masking includes placing the portions of the depth map to obscure one or more of: faces and license plates.

17. The method of claim 12, wherein providing the obscured image includes providing the obscured image in place of the original image to secure personally identifiable information (PII).

* * * * *